Nov. 3, 1959     R. G. CORBIN     2,911,247
VEHICLE TAIL GATE LATCH

Filed Feb. 14, 1957     2 Sheets-Sheet 1

INVENTOR.
Russel G. Corbin
BY
ATTORNEY.

Nov. 3, 1959  R. G. CORBIN  2,911,247
VEHICLE TAIL GATE LATCH
Filed Feb. 14, 1957  2 Sheets-Sheet 2
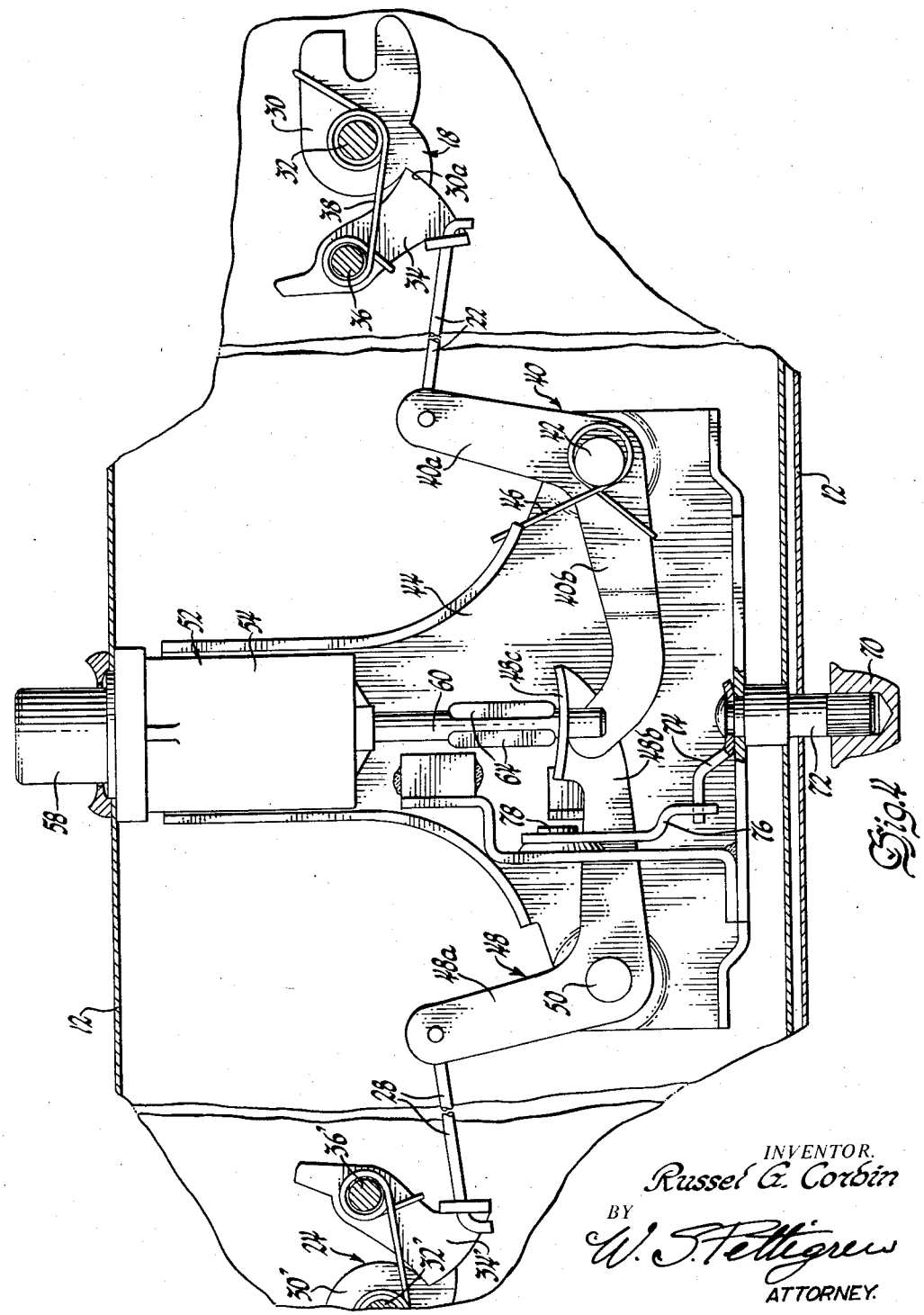
INVENTOR.
Russel G. Corbin
BY
W. S. Pettigrew
ATTORNEY.

United States Patent Office 2,911,247
Patented Nov. 3, 1959

2,911,247

VEHICLE TAIL GATE LATCH

Russel G. Corbin, Inkster, Mich., assignor to General Motors Corporation, Detroit, Mich., a corporation of Delaware Application February 14, 1957, Serial No. 640,174

2 Claims. (Cl. 292—48)

This invention relates to a vehicle tail gate latch, and more particularly to a station wagon tail gate latch having inside and outside operators.

One feature of the invention is that it provides an improved vehicle tail gate latch; another feature of the invention is that it provides a station wagon tail gate latch having inside and outside operators; still another feature of the invention is that it provides a push button outside operator and a turn handle inside operator; a further feature of the invention is that the latch is so arranged that less force is required to release the latch by means of the push button operator than is required to release the latch by means of the turn handle operator; and still a further feature of the invention is that the push button operator may be locked so that it "free wheels" without releasing the latch while the inside turn handle operator is always connected to release the latch.

Other features and advantages of the invention will be apparent from the following description and from the drawings, in which:

Fig. 4 is a horizontal transverse section taken along the line 4—4 of Fig. 1, intermediate parts of the tail gate being broken away.

Station wagon bodies are provided with a tail gate which swings about a horizontal axis between open and closed positions. The tail gate is latched at each of its opposite sides to the station wagon body, the latches being carried on the tail gate for engagement with stationary keepers on the vehicle body. Since it is often desirable to open the tail gate with one hand, as for example when the operator is carrying an armload of packages, a single operating means for both latches is located adjacent the center line of the station wagon body, and this operator is arranged to release both latches simultaneously.

In the past it has not been the practice to provide an inside handle for opening the tail gate. This invention provides a latch for a station wagon tail gate having a push button outside operator which may be locked with a key and which, when unlocked, may be actuated simultaneously to release both latches. There is also an inside turn handle for releasing the latches so arranged that it does not interfere with the outside operating parts. Since more leverage force is available in a turn handle than is available in a finger operated push button, the parts are so arranged that a shorter lever arm is provided for the turn handle than is provided for the push button.

Figure 1:
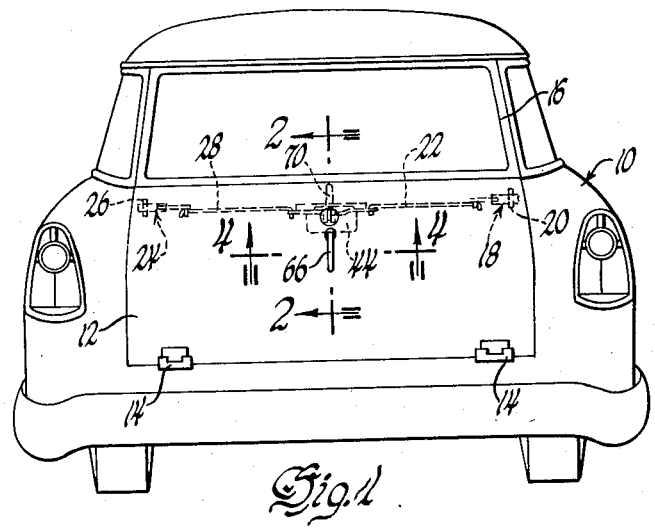
Fig. 1 is a rear view of a station wagon incorporating the improved latch.

Referring now in particular to the drawings, in Figure 1, a station wagon is designated generally as 10, and the rear end of the station wagon body is provided with a lower tail gate 12 which swings on a horizontal axis on hinges 14 located at the bottom edge of the tail gate.

There is also an upper tail gate or lift gate 16 which swings about a horizontal axis on hinges (not shown) located adjacent the upper edge of the lift gate. Only one latch means is provided for the lift gate and the tail gate, and the part which carries the latch means may overlie the other part when in closed position to prevent unauthorized opening of the unlatched part. Conventionally the latch is carried on the lower tail gate and the upper edge of the lower tail gate overlies the lower edge of the upper tail gate or lift gate, and this is the arrangement illustrated in the drawings. Obviously, the latch means could be carried on the lift gate and its lower edge could overlie the upper edge of the lower tail gate to hold the lower tail gate closed. This reversal of parts is obvious and it is to be understood that the latch could be mounted on either the tail gate or lift gate and the term "tail gate" is used in this specification and claims in a generic sense to include both closure members.

With further reference to Figure 1, the tail gate 12 carries a latch designated generally as 18 and including a bolt which cooperates with a stationary keeper 20 on the station wagon body. This latch is connected by a rod 22 to the operating means which are located adjacent the longitudinal center of the vehicle. At its other side, the tail gate 12 carries a latch designated generally as 24 and having a bolt for engagement with a stationary keeper 26 on the body. The latch 24 is connected by a rod 28 to the operating means.

With reference to Figure 4, the latch 18 includes a bolt 30 which is pivoted on a stud 32 on the tail gate. The bolt is bifurcated for engagement with the keeper 20 shown in Figure 1. A detent 34 is pivoted on the tail gate on a stud 36 and has a free foot portion adapted to engage a shoulder 30a on the bolt to hold the bolt in latched position. A spring 38 is connected between the bolt and the detent and urges the bolt toward unlatched position and the detent towards bolt holding or latched position.

At the other side of the station wagon body the latch 24 includes a similar bolt 30' pivoted on the tail gate on a stud 32' and adapted to be held in latched position by a detent 34' which is pivoted at 36'. The latches 18 and 24 are of conventional construction.

As shown in Figure 4, the rod 22 has one end hooked into a flange on the detent 34 and the other end articulated to the free end of an arm 40a of a bell crank designated generally as 40. This bell crank is pivoted on a stud 42 projecting from a mounting bracket 44 which is welded or otherwise secured inside the tail gate between the inner and outer panels thereof. The bell crank 40 has another arm 40b extending at an angle to the arm 40a and terminating adjacent the longitudinal center line of the station wagon body. A spring 46 biases the bell crank 40 in a clockwise direction as the parts appear in Figure 4. At the other side of the body the rod 28 has one end hooked into a flange in the detent 34' and the other end articulated to one arm 48a of a second bell crank designated generally as 48. This bell crank is pivoted on a stud 50 extending from the bracket 44 and the bell crank has a second arm 48b extending toward the arm 40b of the first bell crank and terminating in a turned flange 48c which overlies the end of the second arm 40b of the bell crank 40. Consequently, when bell crank 48 is swung in a clockwise direction the flange 48c will pick up the first bell crank 40 and cause it to swing in a counterclockwise direction. Similarly, when the bell crank 40 is returned by the spring 46 to the position shown in Figure 4, it will carry with it the bell crank 48.

Figure 3:
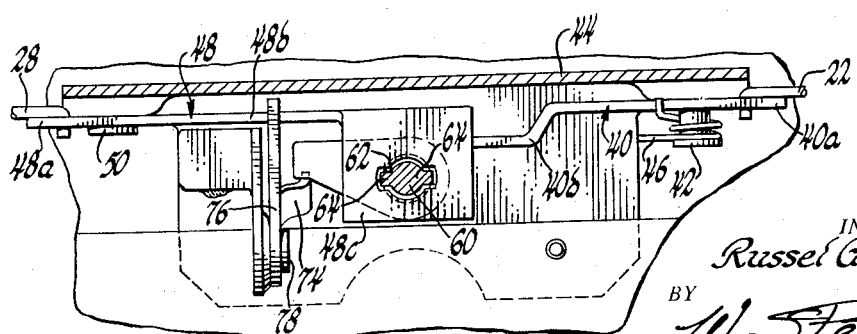
Fig. 3 is a detail section taken along the line 3—3 of Fig. 2.

A first latch operating means on the tail gate comprises a push button and lock assembly designated generally as 52. This assembly includes a lock barrel 54 of conventional construction adapted to be operated by a key 56 which may be inserted in a key opening in the end of a push button 58 which projects out through the outer panel of the tail gate 12. A control push rod 60 is secured to and is movable axially by the push button 58. The control rod may be rotated through an arc of ninety degrees by the lock cylinder 54 in conventional manner. The free end portion of the rod 60 projects through an elongated opening 62 in the flange 48c, and the push rod 60 has an intermediate portion formed with opposed wings 64. When the parts are in the position shown in Figure 3, the push rod 60 has been rotated by the key 56 so that the wings 64 can pass freely through the elongated slot 62 when the push button 58 is depressed so that the push button merely free wheels without operating the latch.

If the key is turned to rotate the push rod 60 through an arc of ninety degrees, the wings 64 of the push rod lie transverse to the elongated slot 62 and upon depression of the push button 58 the wings will engage the flange 48c and pivot the bell crank 48 in a clockwise direction to pull on the rod 28 and release the detent 34' from the bolt 30'. Simultaneously, the flange 48c on the bell crank 48 will pick up the bell crank 40 and swing it in a counterclockwise direction, pulling on the rod 22 and swinging the detent 34 out of engagement with the bolt 30, so that both latches are released.

The push button 58 projects out through the outer wall of the tail gate 12 and a stationary gripping handle 66 is secured by bolts 68 on the outer wall immediately below the push button.

In the past it has not generally been the practice to provide an inside handle for releasing the tail gate latches, but often such an inside release handle is desirable, particularly if passengers are to be carried in the rear end of the station wagon body. For various reasons including styling considerations, it is preferred to use a finger operated push button on the outside of the station wagon. This invention includes an inside turn handle combined with the outside push button operator, and the turn handle is so arranged that none of its parts interfere with parts of the outside operating means. Since more leverage force is available to turn a handle than is available to operate a finger push button, the turn handle release is so arranged to utilize a shorter lever arm in releasing the latches than is utilized in connection with the outside push button arrangement above described.

Figure 2:
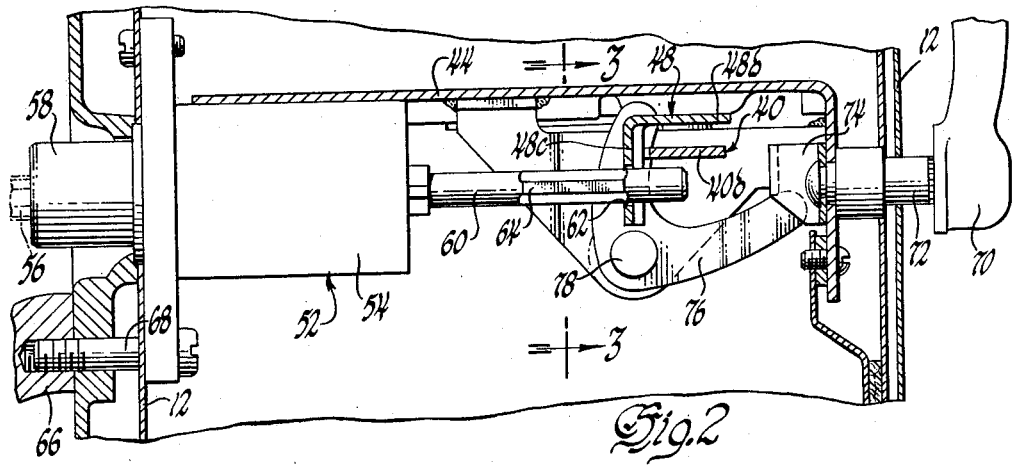
Fig. 2 is an enlarged vertical transverse section through the latch taken along the line 2—2 of Fig. 1.

A turn handle 70 is driven on the knurled end of a shaft 72 which is rotatably mounted on the bracket 44 and which projects inside the station wagon body through an opening in the tail gate inner panel. On the inner end of this shaft a lever arm 74 is rigidly mounted. A bell crank 76 is pivotally mounted on a stud 78 on the bracket 44. One arm of this bell crank lies adjacent to the lever arm 74 and the other arm overlies the second arm 48b of the bell crank 48. When the handle 70 is turned, the bell crank 76 pivots in a clockwise direction as the parts are shown in Figure 2, picking up the bell crank 48, which in turn picks up the bell crank 40 simultaneously to release both latches. The connection between the bell crank 76 and the bell crank 48 is closer to the pivotal axis 50 of the bell crank 48 than is the flange 48c to provide a shorter lever arm for operation by the turn handle 70 than is provided for operation by the push button 58.

While I have shown and described one embodiment of my invention, it is capable of many modifications. Changes, therefore, in the construction and arrangement may be made without departing from the spirit and scope of the invention as set forth in the appended claims.

I claim:

1. A station wagon tail gate latch of the character described, including: a pair of latches adapted to be disposed adjacent opposite sides of the station wagon; a mounting bracket disposed between said latches; a first bell crank lever pivotally mounted on said bracket, said lever having a first arm connected to one latch and a second arm extending at an angle to the first arm; a second bell crank lever pivotally mounted on said bracket at a location spaced in the direction of said second arm from the pivotal mounting of said first lever, said second lever having a first arm connected to the other latch and the second arm extending toward said first lever and terminating in a turned flange which overlies the second arm of the first lever, said flange having an elongated opening therethrough; first latch operating means on the tail gate comprising a push button connected to a rotatably and axially shiftable control rod having a free end portion extending through the opening in said flange and a winged intermediate portion adapted to engage said flange and swing both levers when the rod is shifted axially while it is rotated to one position, the winged portion sliding through said opening without swinging said levers when the rod is shifted axially while it is rotated to another position; second latch operating means on the tail gate comprising a swingably mounted turn handle and a bell crank pivotally mounted on said bracket and having one arm disposed adjacent said turn handle for operation thereby and another arm overlying the second arm of said second lever at a location closer to the pivotal axis of said second lever than is said flange to provide a shorter lever arm for operation by the turn handle than is provided for operation by said control rod.

2. A station wagon tail gate latch of the character described, including: a pair of latches adapted to be disposed adjacent opposite sides of the station wagon, each latch comprising a pivoted bolt and a detent for holding the bolt in latched position; a mounting bracket disposed between said latches; a first bell crank lever pivotally mounted on said bracket, said lever having a first arm connected to the detent of one latch and a second arm extending at an angle to the first arm; a second bell crank lever pivotally mounted on said bracket at a location spaced in the direction of said second arm from the pivotal mounting of said first lever, said second lever having a first arm connected to the detent of the other latch and a second arm extending toward said first lever and terminating in a turned flange which overlies the second arm of the first lever, said flange having an elongated opening therethrough; first latch operating means on the tail gate comprising a push button connected to a rotatably and axially shiftable control rod having an end portion extending through the opening in said flange and a winged intermediate portion adapted to engage said flange and swing both levers when the rod is shifted axially while it is rotated to one position, the winged portion sliding through the opening without swinging said levers when the rod is shifted axially while it is rotated to another position; second latch operating means on the tail gate, comprising a swingably mounted turn handle; and a bell crank pivotally mounted on said bracket and having one arm disposed adjacent said turn handle for operation thereby and another arm overlying the second arm of said second lever at a location closer to the pivotal axis of said second lever than is said flange to provide a shorter lever arm for operation by the turn handle than is provided for operation by said control rod.

References Cited in the file of this patent

UNITED STATES PATENTS

| 83,697 | Davis | Nov. 3, 1868 |
| 267,168 | Dudley | Nov. 7, 1882 |
| 1,058,346 | Berstler | Apr. 8, 1913 |
| 1,200,178 | Erhman | Oct. 3, 1916 |
| 1,297,427 | Wightman | Mar. 18, 1919 |
| 2,468,644 | Springer | Apr. 26, 1949 |
| 2,839,912 | Corbin et al. | June 24, 1958 |

FOREIGN PATENTS

| 534,780 | France | Jan. 12, 1922 |